United States Patent
Klein

(10) Patent No.: US 10,715,499 B2
(45) Date of Patent: Jul. 14, 2020

(54) SYSTEM AND METHOD FOR ACCESSING AND MANAGING KEY-VALUE DATA OVER NETWORKS

(71) Applicant: Toshiba Memory Corporation, Tokyo (JP)

(72) Inventor: Yaron Klein, Raanana (IL)

(73) Assignee: Toshiba Memory Corporation, Tokyo (JP)

( * ) Notice: Subject to any disclaimer, the term of this patent is extended or adjusted under 35 U.S.C. 154(b) by 205 days.

(21) Appl. No.: 15/855,713

(22) Filed: Dec. 27, 2017

(65) Prior Publication Data

US 2019/0199690 A1 Jun. 27, 2019

(51) Int. Cl.
| | |
|---|---|
| *H04L 29/06* | (2006.01) |
| *H03M 13/00* | (2006.01) |
| *H03M 13/11* | (2006.01) |
| *H03M 13/15* | (2006.01) |

(52) U.S. Cl.
CPC ........ *H04L 63/0428* (2013.01); *H04L 63/061* (2013.01); *H04L 63/162* (2013.01); *H03M 13/1102* (2013.01); *H03M 13/152* (2013.01); *H03M 13/611* (2013.01)

(58) Field of Classification Search
CPC ................... H04L 63/061; H04L 63/0428
See application file for complete search history.

(56) References Cited

U.S. PATENT DOCUMENTS

| | | | |
|---|---|---|---|
| 7,191,249 B1 * | 3/2007 | Lacroute | G06F 15/17 709/224 |
| 7,464,156 B2 | 12/2008 | Amir et al. | |
| 9,081,665 B2 | 7/2015 | Schuette et al. | |
| 9,430,412 B2 | 8/2016 | Huang | |

(Continued)

FOREIGN PATENT DOCUMENTS

| | | |
|---|---|---|
| CN | 103080894 A | 5/2013 |
| CN | 103929475 A | 7/2014 |

(Continued)

OTHER PUBLICATIONS

Ki Yang Seok, "Key Value SSD Explained-Concept, Device, System, and Standard", Sep. 14, 2017, Director of Memory Solutions Lab. Samsung Semiconductor Inc., pp. 1-53. https://www.snla.org/sites/default/files/SDC/2017/presentations/Object_ObjectDriveStorage/Ki_Yang_Seok_Key_Value_SSD_Explained_Concept_Device_System_and_Standard.pdf.

(Continued)

*Primary Examiner* — Ali Shayanfar
(74) *Attorney, Agent, or Firm* — Foley & Lardner LLP

(57) ABSTRACT

A device for storing key-value (KV) data includes non-volatile memory and a controller. The controller includes a decapsulator and a KV mapper to receive network data communicated over a network, for example using a layer 2 protocol. The decapsulator is configured to decapsulate a payload from the network data, the payload including a key-value pair and first information. The KV mapper is configured to receive the key-value pair and the first infor- (Continued)

mation decapsulated from the network data, and determine, based on the received key-value pair and first information, a first location of the non-volatile memory. The controller is further configured to store KV data corresponding to the key-value pair at the first location of the non-volatile memory based on the first information.

26 Claims, 11 Drawing Sheets

(56) References Cited

U.S. PATENT DOCUMENTS

| | | | |
|---|---|---|---|
| 9,606,915 B2 | 3/2017 | Horspool et al. | |
| 9,782,602 B1* | 10/2017 | Lowin | A61N 2/06 |
| 9,813,396 B2* | 11/2017 | Thomas | H04L 65/4084 |
| 10,402,252 B1* | 9/2019 | Habusha | G06F 11/3006 |
| 2006/0184565 A1* | 8/2006 | Nishikawa | G06F 3/067 |
| 2012/0166748 A1 | 6/2012 | Satoyama et al. | |
| 2013/0297655 A1* | 11/2013 | Narasayya | H04L 41/5009 707/791 |
| 2013/0297788 A1* | 11/2013 | Itoh | G06F 16/113 709/224 |
| 2013/0312006 A1* | 11/2013 | Hardman | H04L 67/1008 718/105 |
| 2015/0026412 A1* | 1/2015 | Eads | G06F 16/9574 711/135 |
| 2016/0070593 A1* | 3/2016 | Harris | G06F 11/3409 718/106 |
| 2016/0124950 A1* | 5/2016 | Tanaka | G06F 16/9014 707/747 |
| 2016/0203050 A1* | 7/2016 | Hrle | G06F 11/1402 707/625 |
| 2016/0266792 A1 | 9/2016 | Amaki et al. | |
| 2017/0070574 A1* | 3/2017 | Sawada | H04L 67/1097 |
| 2017/0331577 A1* | 11/2017 | Parkvall | H04L 5/0053 |
| 2018/0107525 A1* | 4/2018 | Govindaraju | G06F 9/52 |
| 2019/0141041 A1* | 5/2019 | Bhabbur | H04L 9/0643 |

FOREIGN PATENT DOCUMENTS

| | | |
|---|---|---|
| JP | 2012-243117 A | 12/2012 |
| JP | 2013-536478 A | 9/2013 |
| JP | 2014-026356 A | 2/2014 |
| JP | 2016-091222 A | 5/2016 |
| JP | 2016-170583 A | 9/2016 |

OTHER PUBLICATIONS

NVM Express Over Fabrics, Revision 1.0, Jun. 5, 2016, Copyright 2007-2016 NVM Express, Inc. pp. 1-49.
International Search Report and Written Opinion of the International Searching Authority dated Apr. 16, 2019 in corresponding application No. PCT/IB2018/060668.

* cited by examiner

SYSTEM AND METHOD FOR ACCESSING AND MANAGING KEY-VALUE DATA OVER NETWORKS

TECHNICAL FIELD

The present disclosure generally relates to systems and methods to control key-value data for remote access over a network, and more particularly, to systems and methods to control communication and/or management of key-value data between computing nodes and storage devices over a network such as an Ethernet network.

BACKGROUND

Various configurations for communication between storage devices and host devices using networks have been introduced by several vendors, for example, Seagate and Western Digital (WDC). Seagate's products connect storage applications via Ethernet directly to disks using simple put and get commands via an open source object storage protocol API. WDC uses more sophisticated software in a drive interface, e.g., iSCSI or Ceph that could be used to connect the devices. Also, some standardization efforts have been made for highly distributed and capacity-optimized workloads in a data center. For example, Seagate established Open-Kinetics forum, including multiple vendors to specific aspects of Kinetics Ethernet drive—API, form factors, etc. These products were low performance with high protocol overheads. More recent high performing products using Non-Volatile Memory Express (NVMe) protocols and using Remote Direct Memory Access (RDMA) networking adapters have been developed, but these require very high cost network adapters and infrastructure. However, improvements in cost-effective and efficient data storage and access still remain desired.

BRIEF DESCRIPTION

According to certain aspects, the present embodiments are directed to systems and methods for storing key-value (KV) data over a network using a commonly used protocol such as Ethernet or other layer 2 (also known as the data link layer in the 7 layer Open Systems Interconnection model) protocol. In embodiments, the KV data are stored, retrieved, and managed using solid state drives (SSDs) having non-volatile memory. In these and other embodiments, information that can be used to manage the storage of KV data is communicated together with the KV data and KV commands.

In one aspect, a device for storing key-value (KV) data includes non-volatile memory and a controller. The controller receives network data communicated over a network, for example using a layer 2 protocol. The controller includes a decapsulator (parser) and a KV mapper. The decapsulator is configured to decapsulate a payload from the network data, the payload including a key-value pair and first information. The KV mapper is configured to receive the key-value pair and the first information decapsulated from the network data, and determine, based on the received key-value pair and first information, a first location of the non-volatile memory. The controller is further configured to store KV data corresponding to the key-value pair at the first location of the non-volatile memory based on the first information.

In another aspect, a method of storing key-value (KV) data includes determining, by a first processor of a computing node, first information associated with an access characteristic of a first key-value pair. The method also includes sending, by the first processor, the first key-value pair and the first information to a storage device via the network, for example using a layer 2 protocol. The method also includes receiving, by a second processor of the storage device, the first key-value pair and the first information. The method also includes determining, by the second processor and based on the first information, a first location in non-volatile memory at the storage device, and storing, by the second processor, KV data corresponding to the first key-value pair at the first location of the non-volatile memory.

In another aspect, a method of communicating key-value (KV) data via a network includes receiving, by a first processor of a first device in the network, a key-value pair containing KV data. The method also includes determining, by the first processor, a key-value based command for managing the key-value pair. The method also includes encapsulating, by the first processor, the key-value pair and the key-value based command in a payload portion of a packet, and sending, by the first processor, the packet having the payload with the encapsulated key-value pair and the key-value based command to a second device in the network, for example via a layer 2 protocol.

DETAILED DESCRIPTION

Among other things, the present applicant recognizes that many existing configurations such as those described above for communication between storage devices and host devices, e.g., iSCSI, and Ceph, are focused on low-performance, low bandwidth, and high-capacity drives. Such drives are typically an integration of a hard disk drive (HDD) with a small CPU to perform, for example, Linux based software such as Ceph or other high-level protocols. The present applicant has further recognized that many improvements to such existing configurations can be achieved by using solid state drives (SSDs) instead of HDDs, as well as by using other storage approaches such as Key-Value storage instead of block-based storage. However, many challenges exist when attempting such solutions in high performance environments such as data centers, while still maintaining low-cost.

Figure 1:
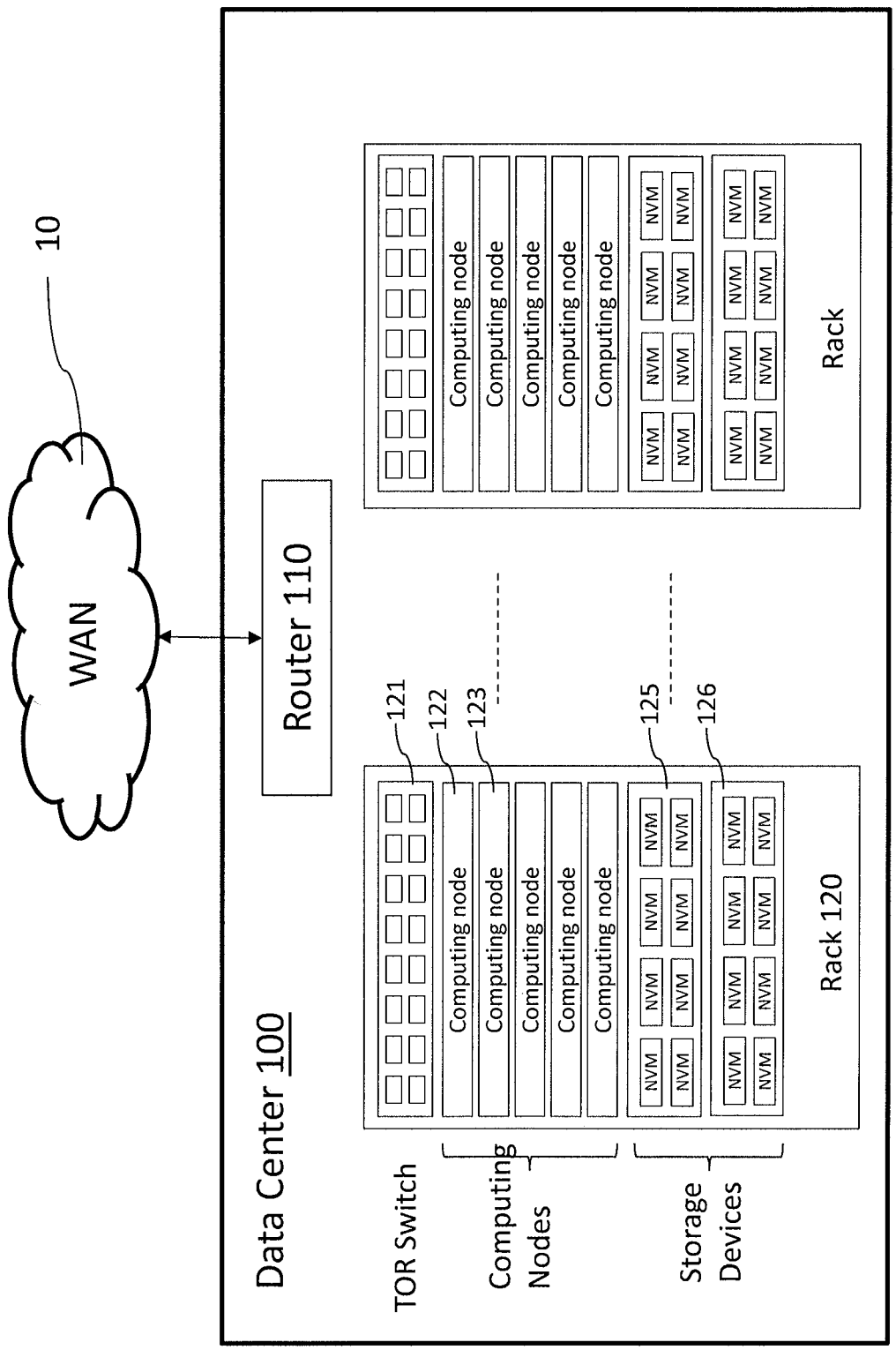
FIG. 1 shows a block diagram of a data center including a plurality of racks, according to some implementations.

To assist in illustrating certain aspects of the present embodiments, FIG. 1 shows a block diagram of a data center according to some implementations. In some implementations, a data center 100 includes a plurality of racks. A rack 120 may be populated with a plurality of computing nodes 122, 123, which run applications, and a plurality of storage devices 125, 126, which maintain data. For example, the computing nodes can run applications such as NoSQL databases, and the storage devices can include non-volatile memory (NVM) devices that maintain the data. In some implementations, the computing nodes and storage devices within a rack are connected and communicate with each other via a Top of Rack (TOR) switch 121.

As further shown in FIG. 1, the data center 100 may include one or more routers 110 that facilitate communications between computing nodes and external devices over a wide area network 10 (e.g., the Internet). As such, the computing nodes in data center 100 may be configured as servers to run cloud applications, software services, virtual machines, etc., for remote clients. The one or more routers 110 may further facilitate communications between computing devices and/or storage devices in different racks.

Figure 2A:
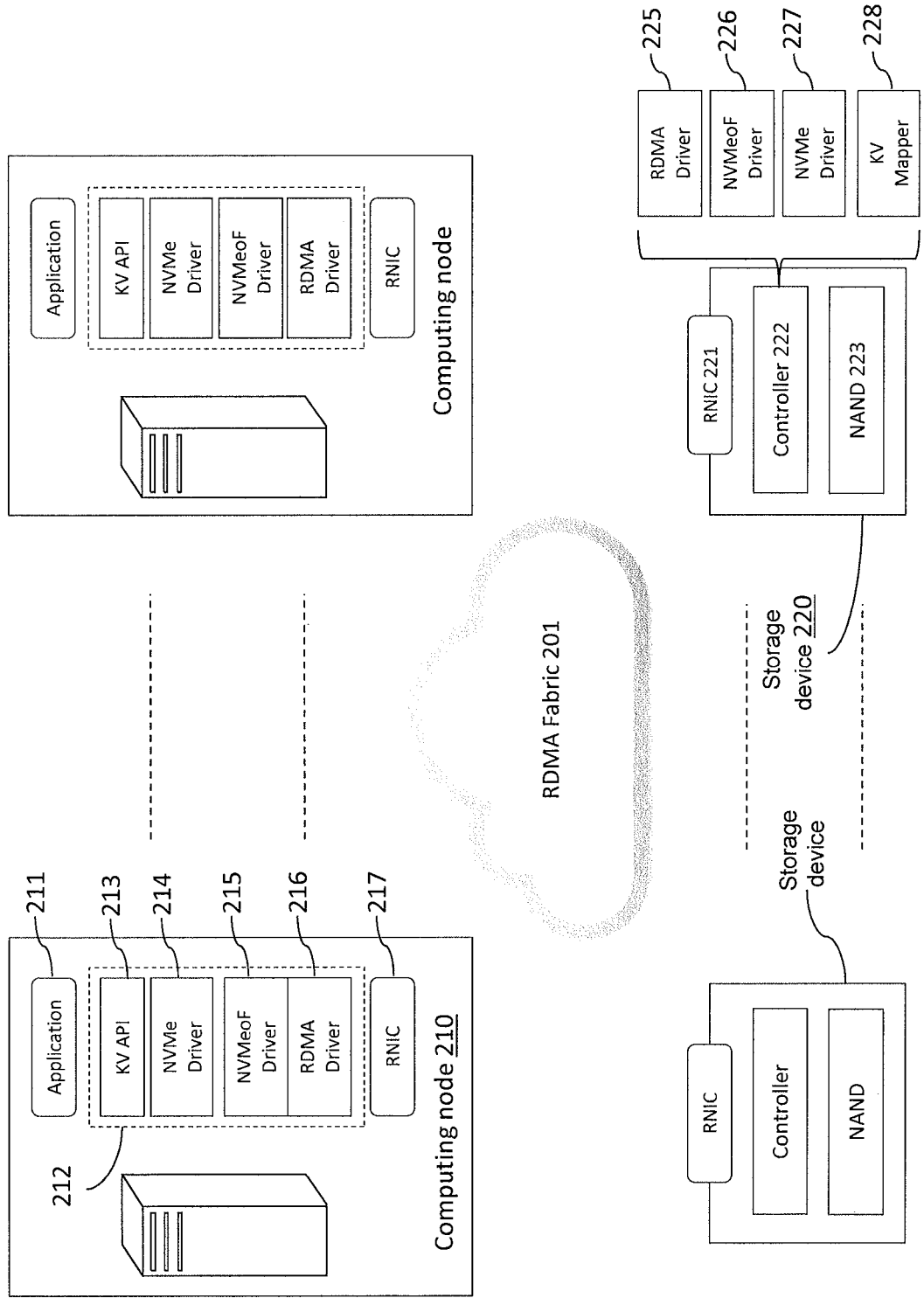
FIG. 2A shows a block diagram of communication between computing nodes and storage devices via an RDMA (remote direct memory access) fabric, according to the prior art.

FIG. 2A is a block diagram illustrating an example conventional implementation (e.g., Samsung Key Value SSD) for managing the storage of data for applications in a data center such as that shown in FIG. 1. As shown in FIG. 2A, in such an implementation, a plurality of computing nodes 210 may communicate with a plurality of storage devices 220 via a Remote Direct Memory Access (RDMA) fabric 201. In some implementations, the RDMA fabric 201 includes one or more switching devices (e.g., TOR switches, routers, etc.) that support RDMA traffic and allow for access from each computing node to each storage device (or vice versa), including devices located in different racks of a data center, for example.

In implementations such as that shown in FIG. 2A, a computing node 210 may include an application 211, a software stack 212, and a Remote-direct-memory-access-enabled Network Interface Controller (RNIC) 217. The application 211 can be a database application (e.g., NoSQL database) or other data center application. The software stack 212 may enable the application 211 to access or manage data in a storage device using key-value pairs and KV commands such as Put, Get, Delete, Query (Exist). The software stack 212 further provides support for communicating with storage devices using a layer 4 protocol (e.g., a transport protocol). In some implementations, the transport protocol is NVMeoF (NVMe over Fabric) for communicating NVMe commands over a RDMA fabric. Although FIG. 2A shows computing node 210 with only a single application 211 for ease of illustration, it should be apparent that computing node 210 can run several or many applications, either independently or concurrently.

In these and other implementations, the software stack 212 includes a key-value (KV) API 213, an NVMe driver 214, a NVMeoF (NVMe over Fabric) driver 215, and an RDMA driver 216. In accordance with a need for accessing and managing data in storage devices, application 211 interfaces with the KV API 213 to generate KV commands and KV pairs. The KV API 213 and NVMe driver 214 encapsulate the generated key-value commands and piggyback them over NVMe vendor specific commands, using the protocol data transfer to implement the key-value protocol used by application 211. The NVMe driver 214 generates the NVMe commands and the NVMeoF driver 215 further encapsulates NVMe commands (e.g., block-oriented Read/Write commands) for transport over the RDMA fabric. In particular, the encapsulated NVMe commands are provided by NVMEoF driver 215 to the RDMA driver 216 and the RDMA traffic may be physically sent via the RNIC 217 to the RDMA fabric 201.

Correspondingly, in some conventional implementations such as that shown in FIG. 2A, a storage device 220 may include a controller 222, a NAND memory device 223, and an RNIC 221. In such implementations, the controller 222 includes an RDMA driver 225, an NVMeoF driver 226, an NVMe driver 227, and a key-value (KV) mapper 228. The RNIC 221 may receive traffic stream from the RDMA fabric 201 and pass it to the RDMA driver 225. The RDMA driver 225 may transfer the stream to the NVMeoF driver 226 that decapsulates the NVMe vendor specific commands from the stream. The NVMe driver 227 may extract key-value commands from the NVMe vendor specific commands and pass them to the key-value mapper 228. The key-value mapper 228 may process a key-value command and cause the controller 222 to perform operations on the NAND memory device 223 according to the key-value command. In some implementations, the storage device 220 may include a Flash Translation Layer (FTL) controller.

Although the use of NAND in the storage devices provides many performance and bandwidth advantages, the present applicant recognizes various issues in connection with conventional implementations such as that shown in FIG. 2A. For example, RNICs and RDMA require low network latencies for performance, which in turn implies no packet loss in the network. For RDMA over Ethernet, this requires lossless Ethernet switches. This makes RNICs and RDMA networking infrastructure very expensive as compared to standard NICs and switches such as Ethernet NICs and switches. Moreover, because computing devices typically only communicate with storage devices within the same rack, which likely only require layer 2 network connectivity, higher layer transport protocols such as TCP, UDP and RDMA are unnecessary. Still further, because approaches such as that shown in FIG. 2A are still built on block-oriented storage protocols such as SATA, SAS, iSCSI and NVMe, the software stack including support for piggybacking KV over multiple block-oriented layers may cause computing latency and overhead.

Relatedly, although not readily apparent from FIG. 2A, the present applicant recognizes even further opportunities for improvement of conventional implementations such as that shown in FIG. 2A. For example, as KV pairs may be small, placement of just a single pair in a single NAND page results in poor NAND utilization. Moreover, placing large numbers of KV pairs in blocks (especially in the case of small pairs) may cause large fragmentation during deletion and problems with efficient garbage collection. One of the main tasks of database applications (i.e., one example of application 211) is compaction, or, garbage collection of data which is deleted or invalidated by over-writing. This task is exacerbated by the problems with storing KV pairs as set forth above. Providing a mechanism whereby this burden, conventionally performed by database and other applications, could be offloaded onto other entities would be desirable.

According to some aspects, therefore, the present embodiments provide systems and methods for storing key-value (KV) data over a network using a common protocol such as Ethernet or other layer 2 protocol. KV data are directly stored, retrieved, and managed for SSDs as a collection of key-value pairs, thereby increasing simplicity and scalability. More particularly, key-value SSDs can reduce redundant steps (e.g., allocation or replacement of blocks), which leads to faster data inputs and outputs, as well as increasing TCO (total cost of ownership) and significantly extending the life of an SSD.

In some implementations, a system for storing KV data includes non-volatile memory and a controller. The controller receives network data communicated over a network using a layer 2 protocol. The controller may include a decapsulator and a KV mapper. The decapsulator may be configured to decapsulate (i.e., parse) a payload from the network data, the payload including a key-value pair and first information. The KV mapper may be configured to receive the key-value pair and the first information decapsulated from the network data, and determine, based on the received key-value pair and first information, a first location of the non-volatile memory. The controller may be further configured to store KV data corresponding to the key-value pair at the first location of the non-volatile memory based on the first information.

According to some aspects, in a rack environment as illustrated in FIG. 1, because the key-value pair and the first information are encapsulated in layer 2 (e.g., link layer) packets, when sending traffic within a rack, there is no need for sending the traffic over upper layers such as TCP, UDP and RDMA, etc. As such, in some implementations, the system for storing KV data includes a standard network interface controller (NIC) for a common protocol such as Ethernet. Thus, this configuration allows computing nodes (e.g., a host device) and key-value storage devices to be connected via low cost standard NICs over standard Ethernet connections. Furthermore, without the need for a large software stack supporting multiple layers, the software overhead can be reduced dramatically, providing higher performance and lower latency.

Figure 2B:
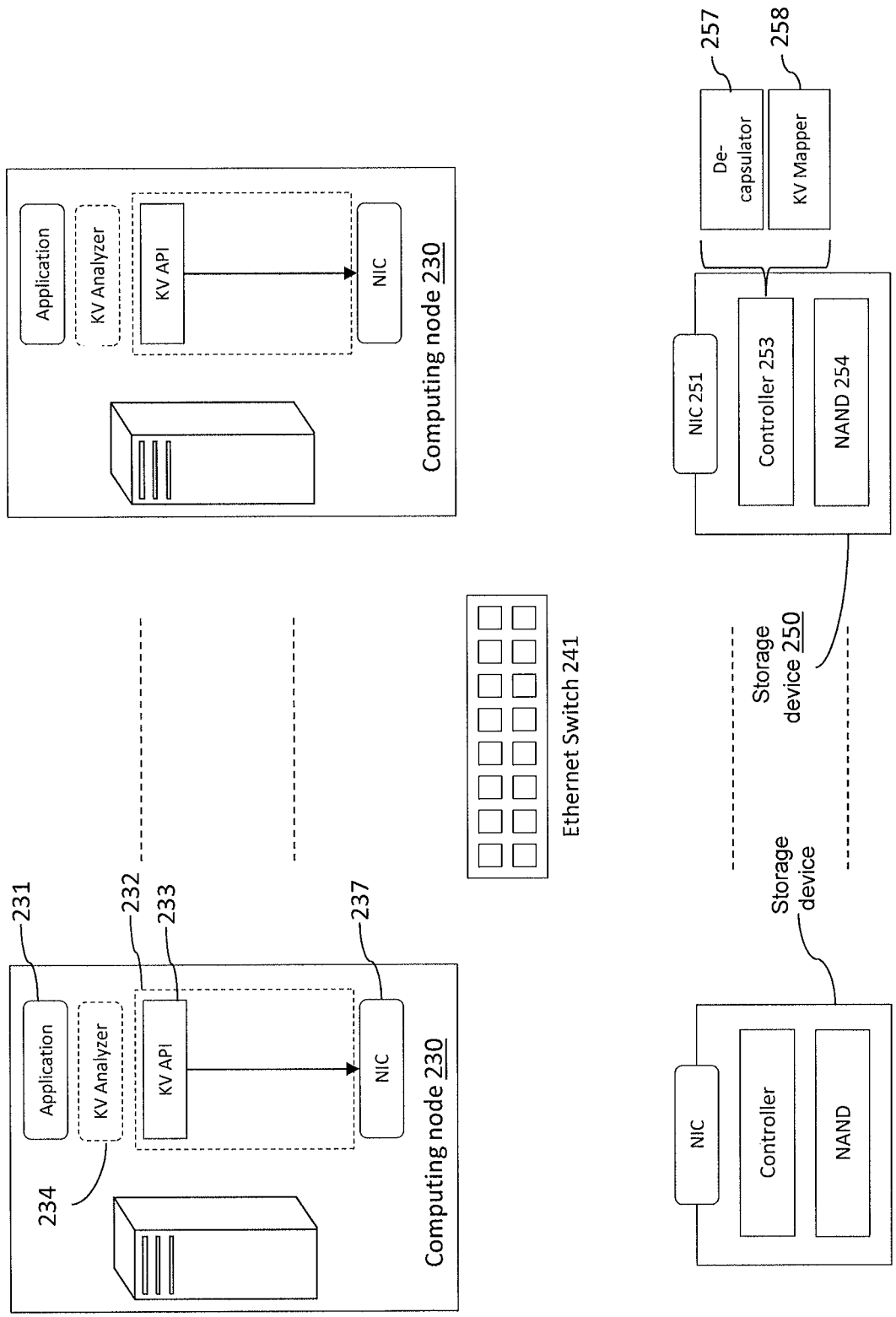
FIG. 2B shows a block diagram of communication between computing nodes and storage devices via an Ethernet switch, according to some implementations.

FIG. 2B shows a block diagram of an example data center according to some implementations. As shown in FIG. 2B, in some implementations, a plurality of computing nodes 230 may communicate with a plurality of storage devices 250 via an Ethernet switch 241 using an Ethernet layer protocol for key-value data access.

More particularly, in implementations such as that shown in FIG. 2B, a computing node 230 may include an application 231, a KV API 233 and a NIC (Network Interface Controller) 237. According to some aspects, KV API 233 allows application 231 to access and manage KV data over a network using a commonly used protocol and relatively inexpensive infrastructure. In some implementations, the protocol is a layer 2 protocol such as Ethernet for local area networks (multi-node). In other implementations, the layer 2 protocol can include the Point-to-Point Protocol (PPP), High-Level Data Link Control (HDLC) and Advanced Data Communication Control Procedures (ADCCP) for point-to-point (dual-node) connections.

In some implementations, the application 231 is a database (e.g., NoSQL database) or other data center application. Whenever application 231 has a need for accessing or managing data in a storage device, application 231 interfaces with the KV API 233 which generates appropriate key-value (KV) commands and encapsulates the generated KV commands in a layer 2 protocol. KV API 233 further interacts directly with the NIC 237 to send the encapsulated KV commands to a storage device 250 via the Ethernet switch 241. As such, the KV API 233 interacts directly with the NIC 237 without interacting with any other drivers or network layers (e.g., upper layers above layer 2). It should be noted that although FIG. 2B shows computing node 230 with only a single application 231 for ease of illustration, it should be apparent that computing node 230 can run several or many applications, either independently or concurrently.

Correspondingly, in implementations such as that shown in FIG. 2B, a storage device 250 may include a controller 253, non-volatile memory (e.g., NAND memory devices 254), and a NIC 251. In some implementations, the controller 253 includes a decapsulator 257 and a key-value (KV) mapper 258. The NIC 251 may receive a traffic stream from the Ethernet switch 241 and pass it to the controller 253. According to some aspects, the NIC 251 is a standard Ethernet NIC that does not include RNIC functionality.

In some implementations, the controller 253 receives network data communicated over a network (e.g., Ethernet) using a layer 2 protocol. The decapsulator 257 may be configured to decapsulate a payload from the network data in a layer 2 packet. In some implementations, the KV mapper 258 is configured to receive KV data (e.g., KV commands or key-value pair) decapsulated from the network data. In some implementations, the controller 253 is further configured to store the decapsulated KV data in the non-volatile memory.

As further shown in FIG. 2B, in some implementations, the application 231 interacts with the KV API 233 via the KV analyzer 234. For example, the application 231 passes a KV pair to the KV analyzer 234 instead of directly passing the KV pair to the KV API 233. In some implementations, the KV analyzer 234 determines access characteristics of the KV pair and then passes the KV pair along with the determined characteristics to the KV API 233, so that KV API 233 transfers the KV pair along with the determined characteristics to the storage device 250 via the Ethernet switch 241 using a layer 2 protocol. As will be described in more detail below, the access characteristics of a KV pair determined by the KV analyzer 234 can include how frequently the KV pair is accessed, an expected retention period of a KV pair, i.e., how long a KV pair is anticipated to be used, whether it is likely that a group of pairs is likely to be deleted together, and a maximum latency upon retrieval or a priority over other KV. Although shown separately for ease of illustration, it should be noted that KV analyzer 234 can be implemented in various additional or alternative ways, for example, as part of an application 231 or KV API 233. Those skilled in the art will understand various implementation alternatives after being taught by the present examples.

Figure 3A:
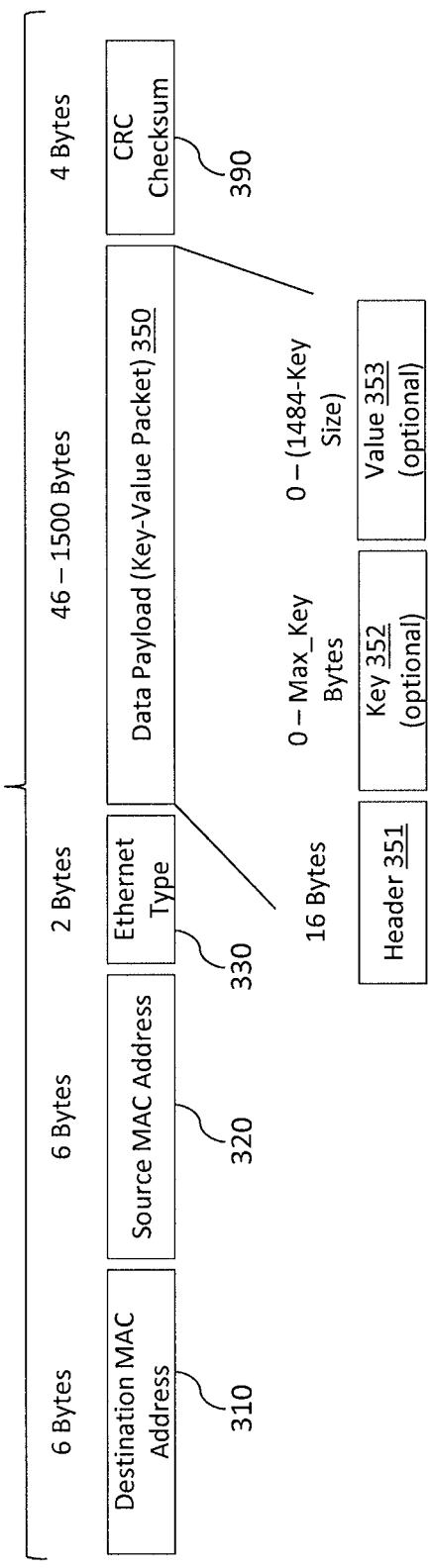
FIG. 3A shows a diagram of an example layer 2 frame carrying a key-value packet, according to some implementations.

Various examples of how KV data can be carried using a layer 2 protocol according to embodiments such as shown in FIG. 2B will now be described in more detail. For example, FIG. 3A shows a diagram of an example layer 2 frame carrying a key-value packet, according to some implementations. In some implementations, an Ethernet frame (e.g., an Ethernet type II frame 300 in FIG. 3A) includes a source MAC address 320 and a destination MAC address 310, which identify the NIC the packet is sent from and the NIC the packets is sent to, respectively. Each MAC address is 6 bytes long to be worldwide unique. An Ethernet frame may include a CRC checksum 390 of 4 bytes, assuring data integrity, e.g., assuring that data is received as it was sent. An Ethernet frame may include 2 bytes Ethernet Type 330, which indicates a type of the Ethernet, e.g., Ethernet Jumbo Frames. In some implementations, an Ethernet data payload 350 includes a variable length 46-1500 bytes, containing data from source to destination. In some implementations, this data payload 350 is used as a key-value packet to carry KV commands and responses from computing nodes (e.g., computing nodes 230 in FIG. 2B) to storage devices (e.g., storage devices 250). In some implementations, KV commands or response according to a KV protocol can be carried over standard Ethernet frames. In some implementations, KV commands or response according to a KV protocol can be carried over Jumbo frames, i.e., Ethernet frames with larger capacity.

As shown in the example of FIG. 3A, a KV protocol is implemented in a defined structure of Ethernet frame data payload. In some implementations, the data payload 350 (key-value packet) includes a fixed size header 351 (e.g., 16 bytes header), including fields for parsing KV commands and responses. In some implementations, an Ethernet frame includes an optional variable size Key field 352 in the data payload 350 (key-value packet) so that the KV protocol can allow a key length to be between 1 byte and Max_Key bytes. Max_Key may be predefined. For example, Max_Key is defined as 255 bytes. In some implementations, an Ethernet frame includes an optional variable size Value field 353 which can carry variable size data corresponding to a key carried in the Key field.

Figure 3B:
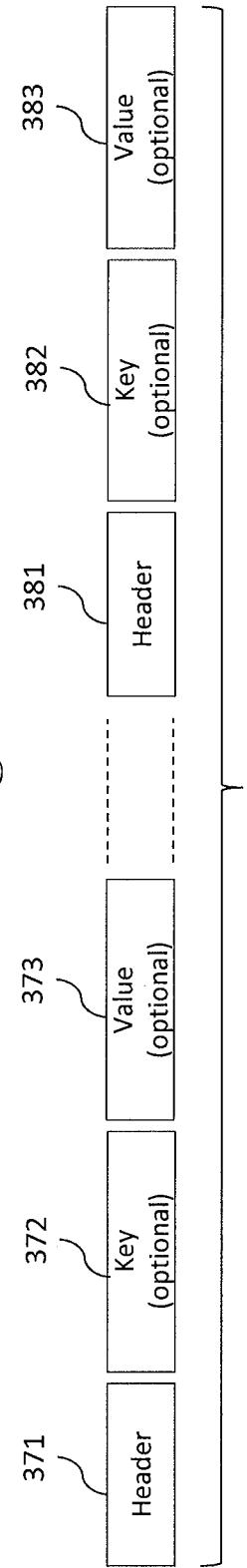
FIG. 3B shows a diagram of example layer 2 frames carrying key-value packets, according to some implementations.

FIG. 3B shows an example of layer 2 frames carrying key-value packets, according to some implementations. In these and other implementations, a KV protocol command or response can be span over multiple Ethernet frames. As shown in FIG. 3B, the same KV protocol command or response can be span over multiple Ethernet frames including a first KV packet in a first Ethernet frame (carrying the header 371, Key 372, and Value 373) and a second KV packet in a second Ethernet frame (carrying the header 381, Key 382, and Value 383), constituting a multi packet key-value pair 370.

Figure 4:
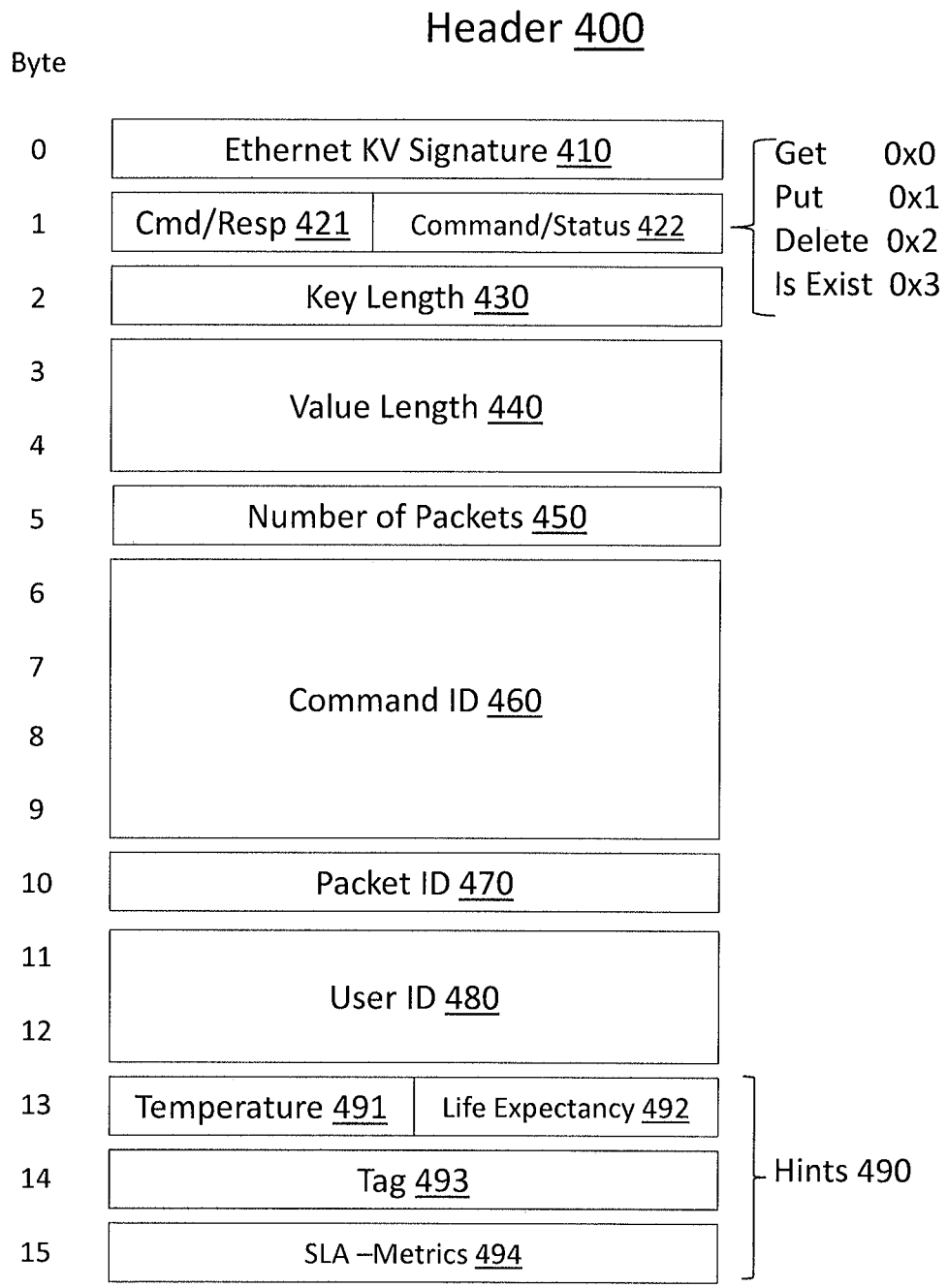
FIG. 4 shows a diagram of a header structure of a key-value packet, according to some implementations.

FIG. 4 shows a diagram of a header structure of a key-value (KV) packet, according to some implementations. In some implementations, a header 400 of a KV packet, e.g., the header 351 of the data payload 350 in FIG. 3A, may be defined as shown in FIG. 4. In other words, the header 351 in FIG. 3A may be defined according to the header structure in FIG. 4.

In some implementations, the header 400 of a KV packet includes one byte defining Ethernet KV Signature 410 which indicates a unique identifier for a KV protocol, allowing a computing node and a storage device to filter non-KV information, e.g., broadcast and multicast information or other protocols. In some implementations, the header 400 of a KV packet includes Cmd/Resp flag 421 which indicates a KV packet type—either Command or Response. For example, a packet of type Command ("command packet") is sent from a computing node to a storage device, and a packet of type Response ("a response packet") is sent from a storage device to a computing node. In some implementations, the header 400 of a KV packet includes Command/Status 422 which indicates a command type, e.g., Get, Put, Delete, Is Exist, or any other command. For example, a Put command is sent from a computing node to a storage device with Cmd/Resp flag 421 set to Command (e.g., to "1") and Command/Status 422 to 0x1. In response to the Put command, a storage device may send a response packet with Cmd/Resp flag 421 set to Response (e.g., to "0") and Command/Status 422 to 0 x1. In some implementations, the header 400 of a KV packet includes one byte defining Key Length 430, indicating the length of the Key field (e.g., Key 352 in FIG. 3A) in the data payload in bytes, allowing a key length to vary from zero to 255 bytes. In some implementations, the header 400 of a KV packet includes two bytes defining Value Length 440, defining the length of the value field (e.g., Value 353 in FIG. 3A) in the data payload in bytes, allowing a value length to vary from zero to 16383 bytes. In some implementations, the header 400 of a KV packet includes Command ID 460 which uniquely identifies each key-value transaction. That is, command and response packets of the same transaction include the same command ID. In some implementations, Command ID 460 is a 4-byte field in the header, allowing for 2=unique commands. In some implementations, a command or response may include multiple packets to carry large value data as shown in FIG. 3B. In some implementations, the header 400 of a KV packet includes one byte defining the number of packets that carry Value data of the same command or response, allowing for up to 255 packets in the same command or response. In some implementations, those packets that carry Value data of the same command or response, are ordered via a Packet ID field 470 in the header 400. That is, the sending/receiving order of the packets is determined according to their Packet IDs, i.e., the packets are sent/received in the order of packets 0, packet 1, etc. That is, Value data that exceeds packet boundaries may be split between multiple packets. In some implementations, the receiver (e.g., a computing node or a storage device) can assemble multiple packets carrying Value data in the same command or response, according to the order indicated by Packet IDs of the multiple packets. In some implementations, the header 400 of a KV packet may include 2 bytes defining User ID which identifies a virtual user. In some implementations, a virtual user can be identified uniquely via a MAC address of a packet so that a computing node can implement an Access Control policy. In some implementations, as a computing node may include multiple applications or multiple virtual machines, the computing node can set more than one User ID. In some implementations, a storage device may further implement an Access policy according to the User ID of a packet.

Referring to FIG. 4, in some implementations, the header 400 of a KV packet can further include a Hints field 490 which indicates characteristics of a key-value pair carried in the Key and Value fields of the KV packet (e.g., the Key 352 and Value 353 in FIG. 3A). In some implementations, a computing node may set a Temperature field 491 of the header 400 indicating a probability or frequency of accesses to the key-value pair. In some implementations, Temperature 491 is set from 0 ("freeze") to 15 ("boil"). For example, a high value in the Temperature field (i.e., a "hot" pair) indicates the key-value pair has a high access frequency (i.e., this pair is frequently accessed) and therefore would be better if retrieved in a fast media (if available). On the other hand, a low value in the Temperature field (i.e., a "cold" pair) indicates the key-value pair has a low access frequency (i.e., this pair is rarely accessed) and thus can be placed on a slow media. In other words, a first value in the Temperature field of a first KV packet higher than a second value in the Temperature field of a second KV packet indicates that the KV pair carried in the first KV packet is more frequently accessed than the KV pair carried in the second KV packet.

In some implementations, the KV analyzer 234 of a computing node 230 (see FIG. 2B) determines how frequently a KV pair is accessed. The computing node may send the KV pair with the Temperature 491 set to a value corresponding to the access frequency. In response, the storage device may place the KV pair in a slow media or a fast media according to the frequency value specified in the Temperature field. For example, the storage device may be configured with an area of high speed memory, such as SRAM or DRAM, where data may be cached quickly before being flushed to slower non-volatile media such as NAND flash memory. Alternatively, different types of non-volatile memory may be employed in a single storage device, such as Phase Change Memory (PCM) or Magnetic RAM (MRAM), in addition to NAND flash memory. In this case the controller places the data in a type of memory according to the value in the Temperature field. A map of memory addresses according to memory speed may be configured at the time the Controller 253 of the Storage device 250 initializes, by the Controller 253 performing a sequence of read and write memory commands to each area of memory in order determine the memory speed. Alternatively, the map may be pre-configured at the time of manufacture.

In some implementations, the Hints field 490 of a KV packet includes a Life Expectancy field 492 indicating an expected period of retention of the key-value pair carried in the KV packet. For example, if a value corresponding to the key-value pair is expected to be used for a month, the storage device may decide to place the data in memory with a specified guaranteed data retention period of at least a month. This improves efficiency since providing guaranteed retention periods in non-volatile flash memory involves expense in terms of reduced capacity (retention period varies inversely according to bits per cell stored) and increased power and reduced read performance (stronger Error Correction Codes (ECC) increase retention period at the expense of increased power and read access times). In some implementations the storage device may be configured to delete the data after the period specified in the Life Expectancy field 492 if the field included a bit to indicate this could be done. In some implementations, the KV analyzer 234 of a computing node 230 (see FIG. 2B) determines an expected retention period of a KV pair, i.e., how long a KV pair is anticipated to be used for. The computing node may send the KV pair with the Life Expectancy field 492 set to a value corresponding to the expected retention period. In response, the storage device may choose to store data in a type of non-volatile memory protected by a type of Error Correcting Code (ECC) according to the value of the Life Expectancy field 492. For example, the storage device may be configured with different types of NAND flash memory, such as Single Level Cell (SLC), Multiple Level Cell (MLC), Triple Level Cell and Quadruple Level Cell (QLC), and with different Error Correction Codes, such as Bose-Chaudhuri-Hocquenghem (BCH), Low Density Parity Code (LDPC) and Quadruple Swing-By Code (QSBC). The retention period of data in NAND flash memory varies according to the number of bits stored in the cell, whereby as the number of bits increases, the retention period decreases. Data with a short life expectancy may therefore be written to QLC memory; data with a long life expectancy to SLC memory and so on. While an ECC scheme like BCH can provide fast access time with low power consumed, the use of stronger ECC schemes such as LDPC and QSBC can increase the data retention periods but at the expense of read access times and power consumed. In some implementations, the storage device may also implement measures to automatically refresh the data in shorter retention period memory such as TLC and QLC NAND memory. In this case, the storage device may make use of both the Life Expectancy field 492 and Temperature field 491 hints in order to, for example, place low temperature and high life expectancy data into QLC memory protected by LDPC and high temperature and low life expectancy data into SLC memory protected by BCH, since SLC accesses are faster than QLC, while QLC memory is more dense and better suited to store long term bulk data which is infrequently accessed. In some implementations, the Life Expectancy field 492 includes a bit to indicate that the storage device may delete the key-value pair after the period value specified in the Life Expectancy field 492 has elapsed.

In some implementations, the Hints field 490 of a KV packet includes a Tag field 493 indicating that key-value pairs tagged with the same tag are placed on the same NAND block. For example, a storage device may place key-value pairs tagged with the same tag on the same NAND block. In some implementations, the KV analyzer 234 of a computing node 230 (see FIG. 2B) determines if it is likely that a group of pairs is likely to be deleted together. If it is likely that the group of pairs is likely to be deleted together, the computing node may tag the group of pairs with the same tag using the Tag field 493. In response, the storage device may place the group of pairs (tagged with the same tag) on the same block, thereby avoiding fragmentation and improving the efficiency of garbage collection.

In some implementations, the Hints field 490 of a KV packet includes a SLA-Metrics field 494 indicating a Service Level Agreement (SLA) for a KV pair carried in the KV packet. In some implementations, a value in the SLA-Metrics field indicates some assured metrics, e.g., a maximum latency upon retrieval or a priority over other KV pairs. In some implementations, the KV analyzer 234 of a computing node 230 (see FIG. 2B) determines a priority of a KV pair over other KV pairs based on a Service Level Agreement for the KV pair. The computing node may send the KV pair with the SLA-Metrics field 494 set to a value corresponding to the determined priority (e.g., value "1" indicates a priority greater than a priority indicated by value "2"). In response, the storage device may store the KV pair and retrieve it in higher priority than other KV pairs that have priorities lower than the priority of the KV pair. In some implementations in a storage device configured with multiple types of memory or using NAND flash memory in different cell storage modes (e.g., SLC, MLC, TLC and QLC), the SL-Metrics field 494 may be used to determine in what area or type of memory the data should be stored.

It should be noted that the Hints field 490 need not be included in all embodiments, or in some or all individual packets of a particular KV transaction. For example, for some transactions, the Hints field 490 may be blank (and optionally default values inserted) and/or not used or ignored by the storage device. In some implementations, to assist in determining which Hint fields will be acted upon, the storage device may indicate which Hint fields are supported through the use of a command to query the storage device capabilities.

Referring to FIG. 3A-FIG. 4, in some implementations, a payload in an Ethernet Frame (e.g., the payload 350 in the Ethernet Type II Frame 300 in FIG. 3A) includes a key-value pair (e.g., the key 352 and the value 353 in FIG. 3A) and first information (e.g., information in a sub-field of the Hints 490 in FIG. 4) in the header of the payload (e.g., the header 351). In some implementations, referring to FIG. 2B, the KV mapper 258 of the storage device 250 is configured to receive the key-value pair and the first information decapsulated from network data by the decapsulator 257, and determine, based on the received key-value pair and first information, a first location of the non-volatile memory (e.g., a location of NAND memory of the NAND memory device 254). In some implementations, the controller 253 of the storage device 250 is further configured to store KV data corresponding to the key-value pair at the first location of the non-volatile memory based on the first information.

In some implementations, the first information indicates an access characteristic of the key-value pair (e.g., information in a sub-field of the Hints 490 in FIG. 4). In some implementations, the first information indicates an access frequency of the key-value pair (e.g., an access frequency indicated in the Temperature field 491 in FIG. 4). In some implementations, the controller 253 of the storage device 250 is configured to store first KV data having a first access frequency higher than a second access frequency of second KV data in a media of the non-volatile memory with faster memory accesses than a media of the non-volatile memory in which the second KV data is stored. For example, the controller 253 may store first KV data having a first access frequency higher than a second access frequency of second KV data in a fast media of the non-volatile memory, which can be accessed more quickly than a slow media of the non-volatile memory in which the second KV data is stored.

In some implementations, the first information includes a life expectancy of the key-value pair indicating a maximum time period of retaining of the key-value pair in the non-volatile memory (e.g., an expected time period of retention indicated in the Life Expectancy field 492 in FIG. 4). In some implementations, the controller 253 of the storage device 250 is configured to store the KV data corresponding to the key-value pair in a memory area or memory type of the non-volatile memory with a retention characteristic commensurate with the value in the Life Expectancy field 492. In some implementations, the controller 253 of the storage device 250 is configured to store the KV data corresponding to the key-value pair in a memory area or memory type of the non-volatile memory in accordance with a combination of the values in the Life Expectancy field 492 and the Temperature field 491. In some implementations, the Life Expectancy field 492 includes a bit to indicate that the storage device may delete the key-value pair when the expected time period of retention has elapsed.

In some implementations, the first information includes a tag on the key-value pair (e.g., a value indicated in the Tag field 494 in FIG. 4). In some implementations, the controller 253 of the storage device 250 is configured to co-locate KV data corresponding to a plurality of key-value pairs tagged with an identical tag by storing in a same block or group of blocks of the non-volatile memory (e.g., the NAND memory device 254 in FIG. 2B).

In some implementations, the first information includes a Service Level Agreement (SLA) for the key-value pair indicating as an assured metric at least one of a maximum latency upon retrieval or a priority over other key-value pairs (e.g., information indicated in the SLA-Metrics field 494 in FIG. 4). In some implementations, the controller 253 of the storage device 250 is configured to retrieve the KV data corresponding to the key-value pair with a latency or a priority satisfying the assured metric indicated in the SLA. In some implementations, the controller 253 of the storage device 250 is configured to store the KV data corresponding to the key-value pair in a memory area or memory type of the non-volatile memory with a read and write access time characteristics satisfying the assured metric indicated in the SLA.

Figure 5A:
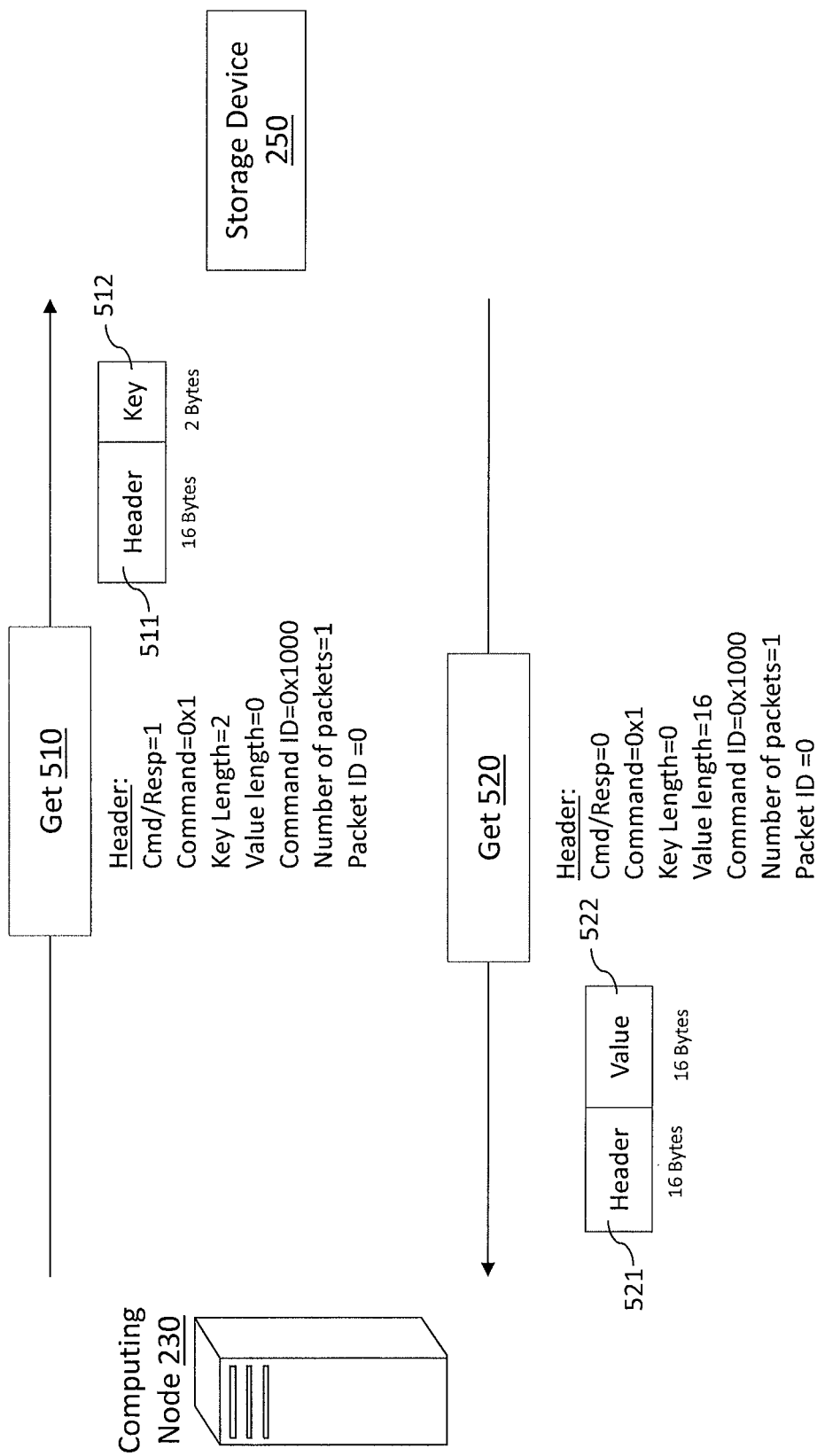
FIG. 5A shows a block diagram of communicating key-value based commands between a computing node and a storage device, according to some implementations.

FIG. 5A shows a block diagram of communicating key-value based commands between a computing node and a storage device, according to some implementations. FIG. 5A shows an example of performing a Get command of a value that fits into a boundary of a KV packet, requesting retrieval of data corresponding to a KV pair in the KV packet. In some implementations, a computing node (e.g., the computing node 230 in FIG. 2B) sends a single KV packet (e.g., a payload of an Ethernet frame) with a Get command 510 to a storage device (e.g., the storage device 250 in FIG. 2B). For an example of a single packet command, the computing node 230 may assign the KV packet with Command ID of 0x1000 and mark Packet ID as "0" in the header 511 of the KV packet. The Cmd/Resp flag is set to Command (=1) because the Get command 510 is issued by the computing node. The Number of Packet field of the KV packet may be set to 1 to indicate that the Get command 510 is sent in a single KV packet. The Key Length of the KV packet may be set to 2 bytes. Because there is no Value in the Get command 510, the Value Length field may be set to 0. The Key field 512 may be concatenated to the header 511 to form a KV packet to be sent to the storage device. In response, the storage device 250 may send a Get response 520 to the computing node 230. The Get response 520 may include a retrieved Value having a length of 16 which fits into the boundaries of Ethernet frame. The storage device may assemble a KV packet with the retrieved Value and set parameters accordingly in the header 521 of the KV packet. In the header 521, the Cmd/Resp flag may be set to Response (=0). The Command ID field may be set to 0x1000 as the Get response 520 is sent in the same transaction as the Get command 510. The Number of Packet field may be set to 1 and Packet ID to 0, because the Get response 520 is sent in a single KV packet. The Value field 522 may be concatenated to the header 521 and the KV packet is sent to the computing node.

Figure 5B:
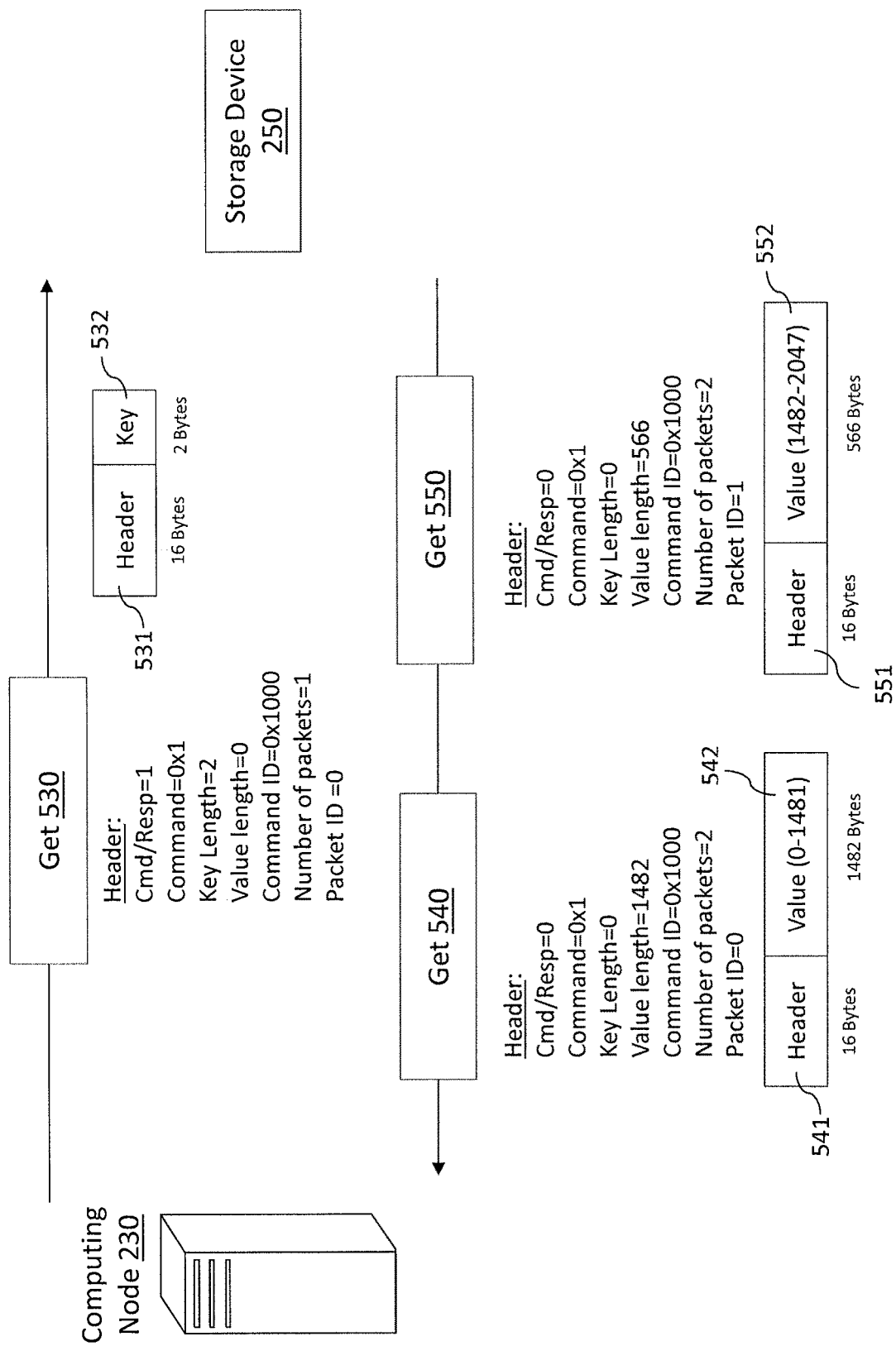
FIG. 5B shows a block diagram of communicating key-value based commands between a computing node and a storage device using multiple key-value packets, according to some implementations.

FIG. 5B shows a block diagram of communicating key-value based commands between a computing node and a storage device using multiple key-value packets, according to some implementations. FIG. 5B is an example of a Get command of a value that exceeds the boundaries of a key-value (KV) packet. For example, a Get command 530 sent from a compute node (e.g., the computing node 230) in a single KV packet (having a header 531 and a Key 532) retrieves a value with size of 2048 bytes from a storage device (e.g., the storage device 250). The storage device may split the value into a first KV packet (having a header 541 and a Value 542) and a second KV packet (having a header 551 and a Value 552) corresponding to a Get response 540 and a Get response 550, respectively. In some implementations, bytes 0-1481 are sent in the first KV packet (Packet ID=0) and bytes 1482-2047 are sent in the second KV packet (Packet ID=1). When these KV packets arrive at the computing node, the computing node may assemble the data according to the order specified in the Packet ID field, e.g., by concatenating the Value fields of the two KV packets in the order of their Packet IDs. In some implementations, a KV protocol can be implemented without having a built-in ordering and retrying mechanism such as in TCP, but can impose this responsibility on the end points (e.g., the computing node and the storage device) in the manner illustrated in FIG. 5B.

Figure 6:
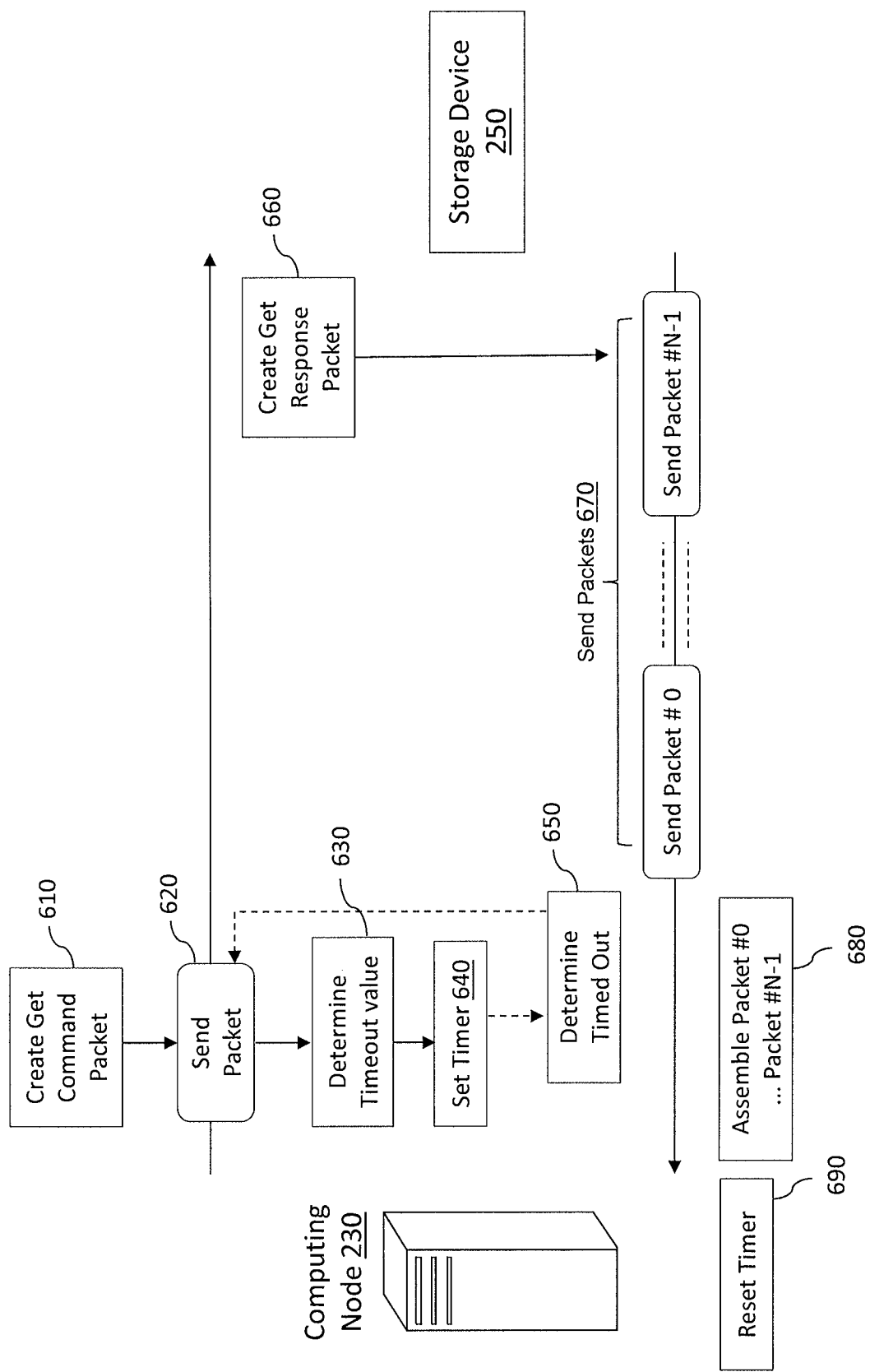
FIG. 6 shows a block diagram of resending key-value data between a computing node and a storage device using a timer, according to some implementations.

FIG. 6 shows a block diagram of resending key-value data between a computing node and a storage device using a time-out mechanism, according to some implementations. FIG. 6 shows an example of implementation of such resending or retry mechanism. In some implementations, a Get command is issued by an application of a computing node (e.g., the application 231 of the computing node 230 in FIG. 2B). In some implementations, the KV API 233 creates, i.e., translates this command into, a KV packet at step 610. The command as the KV packet is then sent to the storage device at step 620, and the computing node determines a timeout value for receiving a response from the storage value at step 630, and set a timer for the determined timeout value at step 640. In some implementations, different timeout values are set for different command types (e.g., different timeout values are set for Get, Put, Delete, or Is Exist as shown in FIG. 4). The computing node then may wait for KV packets with the same Command ID as the Command ID of the KV packet sent at step 620. For example, the storage device receives the command and retrieves an appropriate value whose length exceed a single Ethernet frame. The storage device may create a Get response as N KV packets with value information set in their headers according to the length of the value at step 660, and send back the N KV packets (e.g., packet #0-packet #N) to the computing node at step 670. The computing nodes may receive the N KV packets with the same Command ID as the Command ID of the KV packet sent at step 620. In some implementations, the computing node may wait for all N KV packets with this Command ID (N is Packet Number). In some implementations, once all N KV packets arrive at the computing node, the computing node assembles the value information from all the KV packets according to their order specified in their headers at step 680, and return this information to the application (e.g., the application 231). In some implementations, when all KV packets arrive, the computing node resets the timer at step 690. In some implementations, if the timer is timed out before all KV packets arrive at step 650, e.g., when a KV packet was dropped in the network (e.g., the network including Ethernet Switch 241), the computing node performs a retry procedure by resending the command to the storage device at step 620. In some implementations, if after several retries the computing node does not receive all KV packets for the value (e.g., due to disconnection), it may return with an error to the application. In some implementations, the computing node and storage device may implement other algorithms than those illustrated in FIG. 6. In some implementations, the command information as sent from the computing node at step 620 may include hints (e.g., values in the Hints field 490 in FIG. 4) for the storage device to improve mapping between key-value pairs and the NAND memory.

The examples of KV protocols over a layer 2 network, as illustrated in FIGS. 3A-FIG. 4, may allow low latency, in-rack connectivity between computing nodes and devices over a layer 2 network (e.g., through the TOR switch 121 in FIG. 1). In some implementations, referring to FIG. 7, a KV protocol is implemented over a network of layer 3 (e.g., IP layer) so that network traffic can occur between racks of a data center or external to the data center through a router (e.g., the router 110 in FIG. 1), for example. In some implementations, a KV protocol is implemented over a layer 4 network so that a KV packet can be carried over UDP packet or a plurality of UDP packets (if a Value exceeds a boundary of a UDP packet).

Figure 7:
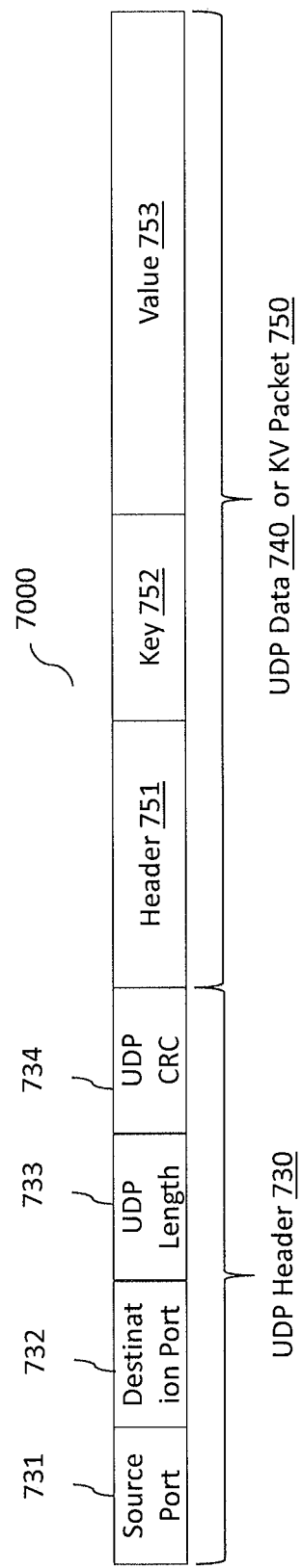
FIG. 7 shows a diagram of an example layer 4 frame carrying key-value packets, according to some implementations.

As shown in FIG. 7, in some implementations, a KV packet 750 is defined as a UDP data payload 740 of the UDP packet 7000 including a header 751, an optional Key field 752, and an optional Value field 753. The UDP packet 7000 may have a standard UDP header 730 including a source port 731, a destination port 732, a UDP Length 733, and a UDP CRC 734. With the definition of KV packet over a UDP packet as illustrated in FIG. 7, the KV protocol has routing capabilities and can allow computing nodes and devices in different racks to be connected and communicated through the router 110.

Figure 8:
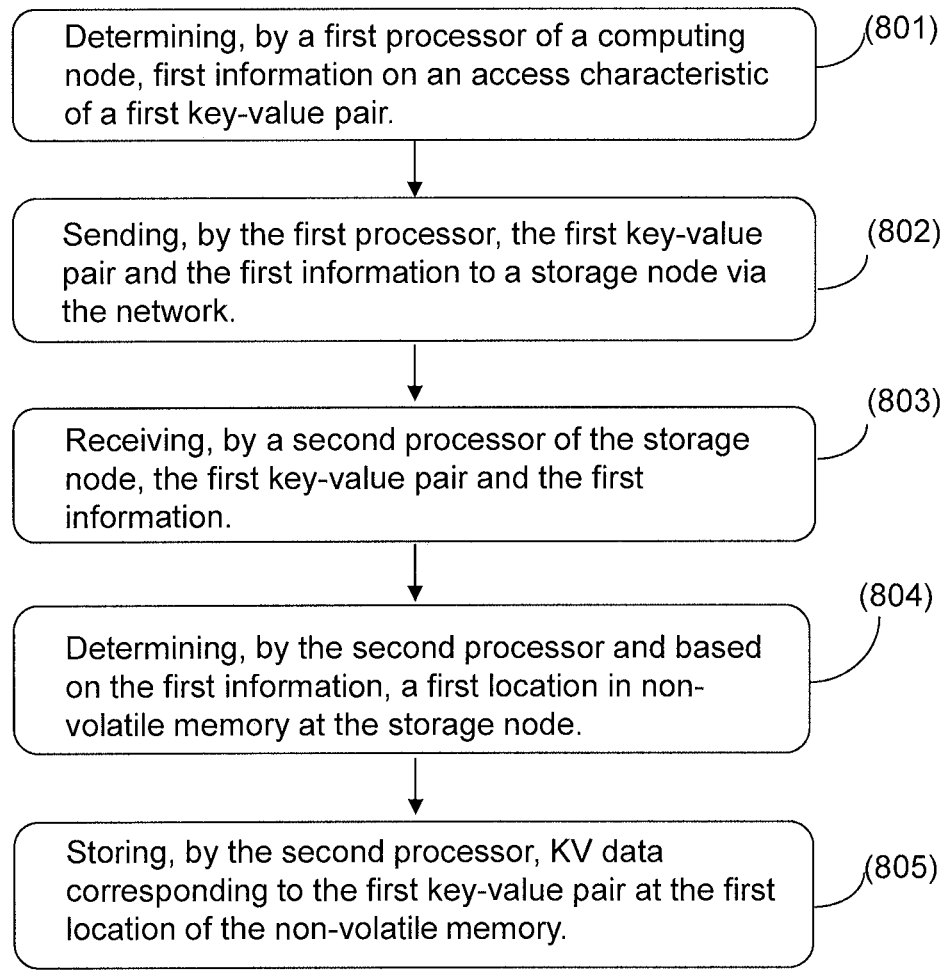
FIG. 8 shows a flow chart of a process for communicating key-value data between a computing node and a storage device using a layer 2 protocol, according to some implementations.

FIG. 8 shows a flow chart of a process for communicating key-value data between a computing node (e.g., the computing node 230 in FIG. 2B) and a storage device (e.g., the storage device 250 in FIG. 2B) over a network, according to some implementations. At step 801, first information (e.g., information indicated in any sub-field of the Hint field 490 in FIG. 4) on an access characteristic of a first key-value pair is determined by a first processor of a computing node. In some implementations, the access characteristic of the first key-value pair may be at least one of (1) an access frequency of the key-value pair (e.g., information indicated in the Temperature field 491 in FIG. 4), (2) a life expectancy of the key-value pair indicating an expected time period of retaining of the key-value pair in the non-volatile memory (e.g., information indicated in the Life Expectancy field 492 in FIG. 4), (3) a tag on the key-value pair indicating a group of key-value pairs stored in the same block of the non-volatile memory (e.g., information indicated in the Tag field 493 in FIG. 4), or (4) a Service Level Agreement (SLA) for the key-value pair indicating as an assured metric (e.g., information indicated in the SLA-Metrics field 494 in FIG. 4).

At step 802, the first key-value pair and the first information are sent by the first processor of the computing node to a storage device via the network. In some implementations, the computing node creates a KV packet as defined in FIG. 3A-FIG. 4 and sends the KV packet to the storage device via a layer 2 protocol through a local switch (e.g., the Ethernet switch 241 in FIG. 2B). In some implementations, the computing node creates a KV packet as a UDP packet defined in FIG. 7 and sends the KV packet to the storage device via a layer 3 or layer 4 protocol through a router (e.g., the router 110 in FIG. 1).

At step 803, the first key-value pair and the first information are received by a second processor of the storage device. In some implementations, the first key-value pair and the first information are decapsulated, by the decapsulator 257 of the storage device (see FIG. 2B), from network data.

At step 804, the first location in non-volatile memory of the storage device (e.g., a block in the NAND memory device 254 in FIG. 2B) for storing KV data corresponding to the first key-value pair is determined based on the first information by the KV mapper 258 of the storage device (see FIG. 2B).

At step 805, the KV data corresponding to the first key-value pair are stored by the controller 253 of the storage device 230 (see FIG. 2B) at the determined first location of the non-volatile memory. In some implementations, if the first information indicates an access frequency of the key-value pair (e.g., information indicated in the Temperature field 491 in FIG. 4), the controller stores the KV data corresponding to the first key-value pair at the first location of the non-volatile memory such that first KV data having a first access frequency higher than a second access frequency of second KV data is stored in a media of the non-volatile memory that can be accessed more quickly than a media of the non-volatile memory in which the second KV data is stored.

In some implementations, if the first information includes a life expectancy of the key-value pair indicating an expected time period of retaining of the key-value pair in the non-volatile memory (e.g., information indicated in the Life Expectancy field 492 in FIG. 4), the controller stores the KV data corresponding to the key-value pair in a memory area or memory type of the non-volatile memory with a retention characteristic commensurate with the value in the Life Expectancy field 492, and may delete the KV data when the maximum time period has elapsed since the first time point when the first information includes a bit indicating the KV data may be deleted.

In some implementations, if the first information includes a tag on the key-value pair (e.g., information indicated in the Tag field 493 in FIG. 4), the controller stores KV data corresponding to a plurality of key-value pairs tagged with an identical tag in the same (or identical) block or group of blocks of the non-volatile memory (e.g., the same block or group of blocks in the NAND memory device 254).

In some implementations, if the first information includes a Service Level Agreement (SLA) for the key-value pair indicating as an assured metric at least one of a maximum latency upon retrieval or a priority over other key-value pairs (e.g., information indicated in the SLA-Metrics field 494 in FIG. 4, the controller retrieves the KV data corresponding to the key-value pair with a latency or a priority satisfying the assured metric indicated in the SLA. For example, if the SLA-Metrics field 494 of the header in a KV pair is set to a value corresponding to the determined priority (e.g., value "1" indicates a priority greater than a priority indicated by value "2"), the controller may store the KV pair and retrieve it in higher priority than other KV pairs that have priorities lower than the priority of the KV pair.

Figure 9:
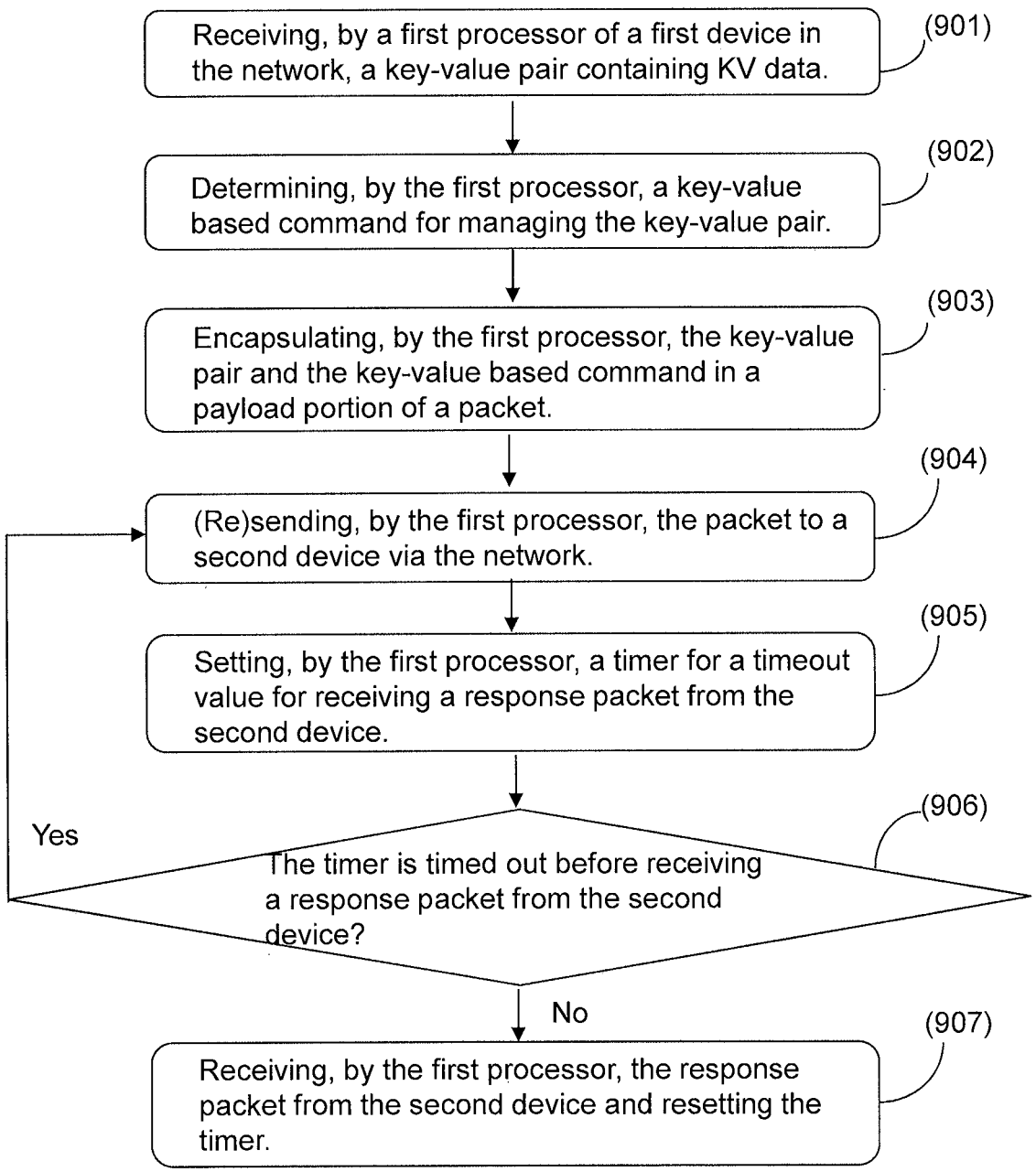
FIG. 9 shows a flow chart of a process for resending key-value data, according to some implementations.

FIG. 9 shows a flow chart of a process for resending key-value (KV) data using a timeout value, according to some implementations. At step 901, in some implementations, referring to FIG. 2B, a key-value pair containing KV data is received by a first processor of a first device (e.g., the computing node 230) from an application (e.g., the application 231). In some implementations, the first device is the computing node 230 (see FIG. 6B) and the second device is the storage node 250 (see FIG. 6B). In some implementations, the first device is the storage node 250 (see FIG. 6B) and the second device is the computing node 230 (see FIG. 6B).

At step 902, in some implementations, a key-value based command for managing the key-value pair is determined and created by the first processor of the first device (see also step 610 in FIG. 6). In some implementations, the key-value based command is created as a KV packet defined in FIG. 3A-FIG. 4. In some implementations, the key-value based command is created as a KV packet over UDP packet defined in FIG. 7.

At step 903, in some implementations, the key-value pair and the key-value based command are encapsulated in a payload portion of a packet (e.g., the data payload 350 of the Ethernet frame 300 in FIG. 3A) by the first processor of the first device.

At step 904, in some implementations, the packet (e.g., the Ethernet frame 300 in FIG. 3A) is sent by the first processor of the first device to a second device (e.g., the storage device 250 in FIG. 2B) via a layer 2 protocol (see step 620 in FIG. 6). In some implementations, the packet includes a plurality of packets (e.g., the plurality of Ethernet frames each of which includes in the respective payload a header, a key field or a value field; see FIG. 3B). In some implementations, the packet (e.g., the Ethernet frame 300 in FIG. 3A) is sent to the second device by sending each of the plurality of packets to the second device in the network via the layer 2 protocol.

In some implementations, the key-value pair and the key-value based command are received by a second processor of the second device. A response to the key-value based command is created (at step 660 in FIG. 6) and encapsulated, by the second processor of the second device, in a payload portion of a response packet. The response packet having the payload with the encapsulated response is sent, by the second processor, to the first device in the network via the layer 2 protocol. In some implementations, the response packet includes a plurality of packets (e.g., packet #0-packet #N-1 in FIG. 6), and the response packet is sent to the first device by sending each of the plurality of packets to the first device in the network via the layer 2 protocol (see step 670 in FIG. 6).

At step 905, in some implementations, after the packet is sent at step 904, a timer is set by the first processor of the first device for a timeout value for receiving a response packet from the second device (at step 640 in FIG. 6). In some implementations, a timeout value for receiving a response packet is determined (at step 630 in FIG. 6) and the timer is set by the first processor of the first device for the determined timeout value (at step 640 in FIG. 6).

At step 906, in some implementations, the first device (e.g., the computing node 230) determines whether the timer is timed out before receiving a response packet from the second device (step 650 in FIG. 6). In some implementations, when the first device determines that the timer is timed out before receiving a response packet from the second device ("Yes" in step 906), the packet is resent by the first processor to the second device via a layer 2 protocol (step 904). In some implementations, if after several resends or retries the first node does not receive a response packet from the second device (e.g., due to disconnection), the first node may return with an error to an application.

At step 907, when the first device does not determine that the timer is timed out before receiving a response packet from the second device ("No" in step 906), the response packet is received by the first processor of the first device from the second device (step 680 in FIG. 6) and the timer is reset (step 690 in FIG. 6).

Those skilled in the art will understand how to adapt the methodology described in connection with the layer 2 protocol example of FIG. 9 to the example layer 4 protocol example such as that described in connection with FIG. 7 after being taught by these example descriptions.

Other objects, advantages and embodiments of the various aspects of the present disclosure will be apparent to those who are skilled in the field of the disclosure and are within the scope of the description and the accompanying Figures. For example, but without limitation, structural or functional elements might be rearranged consistent with the present disclosure. Similarly, principles according to the present disclosure could be applied to other examples, which, even if not specifically described here in detail, would nevertheless be within the scope of the present disclosure.

What is claimed is:

1. A device for storing key-value (KV) data, comprising:
non-volatile memory; and
a controller that receives network data communicated over a network using a layer 2 protocol, the controller including:
a decapsulator configured to decapsulate a payload from the network data, the payload including a key-value pair and first information provides information on how to store KV data corresponding to the key-value pair in the payload, wherein the first information provides at least one or both of an access frequency of the key-value pair and a tag on the key-value pair, and a KV mapper configured to receive the key-value pair and the first information decapsulated from the network data, and determine, based on the received key-value pair and first information, a first location of the non-volatile memory, wherein the controller is further configured to store KV data corresponding to the key-value pair at the first location of the non-volatile memory based on the first information that was communicated over the network in the network data together with the KV data and decapsulated from the network data.

2. The device of claim 1, wherein the layer 2 protocol comprises Ethernet.

3. The device of claim 1, wherein the first information indicates an access characteristic of the key-value pair.

4. The device of claim 1, wherein:
the first information indicates an access frequency of the key-value pair, and
the controller is further configured to store first KV data having a first access frequency higher than a second access frequency of second KV data in a media of the non-volatile memory which has faster memory accesses than a media of the non-volatile memory in which the second KV data is stored.

5. The device of claim 1, wherein:
the first information includes a life expectancy of the key-value pair indicating an expected time period of retaining of the key-value pair in the non-volatile memory, and
the controller is further configured to store the KV data corresponding to the key-value pair at a first time point in a type of non-volatile memory protected by a type of Error Correcting Code (ECC) according to the value of the expected time period, and
when the first information includes a bit indicating that the data may be erased after the expected time period, delete the KV data when the maximum time period has elapsed since the first time point.

6. The device of claim 5, wherein
the type of non-volatile memory may be one of a single level cell (SLC), multiple level cell (MLC), triple level cell (TLC) or quadruple level cell (QLC) non-volatile memory.

7. The device of claim 5, wherein
the type of ECC may be one or more of BoseChaudhuri-Hocquenghem (BCH), Low Density Parity Code (LDPC) or Quadruple Swing-By Code (QSBC) codes.

8. The device of claim 1, wherein:
the first information includes a tag on the key-value pair, and
the controller is further configured to store KV data corresponding to a plurality of key-value pairs tagged with an identical tag in an identical block or identical group of blocks comprising a plurality of blocks, of the non-volatile memory.

9. The device of claim 1, wherein:
the first information includes a Service Level Agreement (SLA) for the key-value pair indicating as an assured metric at least one of a maximum latency upon retrieval or a priority over other key-value pairs, and the controller is further configured to retrieve the KV data corresponding to the key-value pair with a latency or a priority satisfying the assured metric indicated in the SLA.

10. A method of storing key-value (KV) data, comprising:
determining, by a first processor of a computing node, first information on an access characteristic of a first key-value pair, wherein the first information provides information on how to store KV data corresponding to the key-value pair;
sending, by the first processor, the first key-value pair and the first information to a storage device via the network using a layer 2 protocol, wherein the first key-value pair and the first information are commonly provided in a payload of network data;
receiving, by a second processor of the storage device, the first key-value pair and the first information, wherein the first information provides at least one or both of an access frequency of the key-value pair and a tag on the key-value pair;
determining, by the second processor and based on the first information that was communicated over the network in the common payload with the first key-value pair in the network data, a first location in non-volatile memory at the storage device, and
storing, by the second processor, KV data corresponding to the first key-value pair at the first location of the non-volatile memory.

11. The method of claim 10, wherein the layer 2 protocol comprises Ethernet.

12. The method of claim 10, wherein:
the first information indicates an access frequency of the key-value pair, and
the KV data corresponding to the first key-value pair is stored at the first location of the non-volatile memory such that first KV data having a first access frequency higher than a second access frequency of second KV data is stored in a media of the non-volatile memory with faster memory accesses than a media of the non-volatile memory in which the second KV data is stored.

13. The method of claim 10, wherein:
the first information includes a life expectancy of the key-value pair indicating a maximum time period of retaining of the key-value pair in the non-volatile memory, and
storing the KV data corresponding to the first key-value pair at the first location of the non-volatile memory includes storing, by the second processor, the KV data corresponding to the key-value pair at a first time point in a type of non-volatile memory protected by a type of Error Correcting Code (ECC) according to the value of the expected time period, and
when the first information includes a bit indicating that the data may be erased after the expected time period, deleting, by the second processor, the KV data when the maximum time period has elapsed since the first time point.

14. The method of claim 13, wherein
the type of non-volatile memory may be one of a single level cell (SLC), multiple level cell (MLC), triple level cell (TLC) or quadruple level cell (QLC) non-volatile memory.

15. The method of claim 13, wherein
the type of ECC may be one or more of Bose-Chaudhuri-Hocquenghem (BCH), Low Density Parity Code (LDPC) or Quadruple Swing-By Code (QSBC) codes.

16. The method of claim 10, wherein:
the first information includes a tag on the key-value pair, and
the method further comprises storing, by the second processor, KV data corresponding to a plurality of key-value pairs tagged with an identical tag in an identical block or identical group of blocks comprising a plurality of blocks, of the non-volatile memory.

17. The method of claim 10, wherein:
the first information includes a Service Level Agreement (SLA) for the key-value pair indicating as an assured metric at least one of a maximum latency upon retrieval or a priority over other key-value pairs, and
the method further comprises retrieving the KV data corresponding to the key-value pair with a latency or a priority satisfying the assured metric indicated in the SLA.

18. A method of communicating key-value (KV) data via a network, the method comprising:
receiving, by a first processor of a first device in the network, a key-value pair containing KV data;
determining, by the first processor, first information and a key-value based command for managing the key-value pair, and creating, by the first processor, the first information and the key-value based command based on the determination, wherein the first information provides at least one or both of an access frequency of the key-value pair and a tag on the key-value pair;
encapsulating, by the first processor, the key-value pair, the first information and the key-value based command together in a common payload portion of a packet; and
sending, by the first processor, the packet having the payload with the encapsulated key-value pair, the first information and the key-value based command.

19. The method of claim 18, wherein the packet comprises an Ethernet packet.

20. The method of claim 18, wherein the packet comprises a UDP packet.

21. The method of claim 18, wherein:
the packet includes a plurality of packets, and
sending the packet to the second device includes sending each of the plurality of packets to the second device in the network via a layer 2 protocol.

22. The method of claim 18, further comprising:
receiving, by a second processor of the second device, the key-value pair and the key-value based command;
encapsulating, by the second processor, a response to the key-value based command together in a common payload portion of a response packet;
sending, by the second processor, the response packet having the payload with the encapsulated response to the first device in the network.

23. The method of claim 22, wherein:
the response packet includes a plurality of packets, and
sending the response packet to the first device includes sending each of the plurality of packets to the first device in the network.

24. The method of claim 22, further comprising:
after sending the packet having the payload with the encapsulated key-value pair and the key-value based command to the second device, determining, by the first processor, a timeout value for receiving the response packet from the second device;
setting, by the first processor, a timer for the determined timeout value; and
determining, by the first processor, that the timer is timed out before receiving the response packet from the second device, and resending, by the first processor, the packet having the payload with the encapsulated key-value pair and the key-value based command to the second device in the network; and
receiving, by the first processor, the response packet from the second device, and determining, by the first processor that the timer is not timed out before receiving the response packet from the second device, and resetting the timer.

25. The method of claim 22, wherein the response packet comprises an Ethernet packet.

26. The method of claim 22, wherein the response packet comprises a UDP packet.

* * * * *